(12) United States Patent
Ling et al.

(10) Patent No.: US 10,790,654 B2
(45) Date of Patent: Sep. 29, 2020

(54) SUPPORT STRUCTURE FOR SUPPORTING A WIRE

(71) Applicant: Preformed Line Products Co., Mayfield Village, OH (US)

(72) Inventors: Lan-Ping Ling, Beachwood, OH (US); Cameron Wallace, Auckland (NZ)

(73) Assignee: Preformed Line Products Co., mayfield village, OH (US)

( * ) Notice: Subject to any disclaimer, the term of this patent is extended or adjusted under 35 U.S.C. 154(b) by 117 days.

(21) Appl. No.: 16/154,787

(22) Filed: Oct. 9, 2018

(65) Prior Publication Data

US 2020/0112157 A1  Apr. 9, 2020

(51) Int. Cl.
*H02G 7/02* (2006.01)

(52) U.S. Cl.
CPC ..................... *H02G 7/02* (2013.01)

(58) Field of Classification Search
CPC .. H02G 7/02; H02G 7/00; H02G 7/04; H02G 7/05; H02G 7/053; H02G 7/06; H02G 7/08; H02G 7/12; H02G 7/14; H01R 4/62; H01R 4/643; H01R 4/646
USPC ........ 174/40 R, 45 TD, 40 CC, 40 TD, 68.1, 174/41, 42, 43, 44; 248/48.1, 68.1
See application file for complete search history.

(56) References Cited

U.S. PATENT DOCUMENTS

| | | | | |
|---|---|---|---|---|
| 4,620,059 A * | 10/1986 | Sherman | ................... | H02G 7/14 174/42 |
| 6,085,008 A * | 7/2000 | Sutehall | ................. | H02G 7/056 174/40 TD |
| 6,372,984 B1 * | 4/2002 | Wang | ....................... | H02G 7/14 174/40 TD |
| 6,648,279 B1 * | 11/2003 | Malin | ..................... | H02G 7/053 174/44 |
| 9,954,350 B2 * | 4/2018 | Timbrell | .................. | H02G 7/02 |

FOREIGN PATENT DOCUMENTS

GB      2406356 B      7/2006

* cited by examiner

*Primary Examiner* — Angel R Estrada
(74) *Attorney, Agent, or Firm* — Cooper Legal Group, LLC (57) ABSTRACT

A support device for supporting a wire includes a first support portion. A second support portion includes a first leg portion and a second leg portion that extends linearly and is attached to the first leg portion and to the first support portion. A third support portion includes a third leg portion having a third inwardly facing surface, which faces towards the third axial opening, and a third outwardly facing surface, which does not face towards the third axial opening. The third inwardly facing surface and the third outwardly facing surface have a different surface roughness. A fourth leg portion has a fourth inwardly facing surface, which faces towards the fourth axial opening, and a fourth outwardly facing surface, which does not face towards the fourth axial opening. The fourth inwardly facing surface and the fourth outwardly facing surface have a same surface roughness.

20 Claims, 11 Drawing Sheets

SUPPORT STRUCTURE FOR SUPPORTING A WIRE

TECHNICAL FIELD

The instant application is directed towards a support structure. For example, the instant application is directed towards a support structure for supporting a wire.

BACKGROUND

Support structures may be used for supporting a wire, or the like. The wire, etc. may be at least partially wound around the support structure.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a support device for supporting a wire is provided. The support device comprises a first support portion extending along a non-linear axis between a first end and a second end. The first support portion defines a support opening through which the first support portion is configured to receive an attachment structure. The support device comprises a second support portion comprising a first leg portion having a first helical winding that defines a first axial opening. The second support portion comprises a second leg portion extending linearly. The second leg portion is attached to the first leg portion and to the first end of the first support portion. The support device comprises a third support portion comprising a third leg portion having a third helical winding that defines a third axial opening. The third helical winding has a third inwardly facing surface, which faces towards the third axial opening, and a third outwardly facing surface, which does not face towards the third axial opening. The third inwardly facing surface and the third outwardly facing surface have a different surface roughness. The third support portion comprises a fourth leg portion having a fourth helical winding that defines a fourth axial opening. The fourth helical winding has a fourth inwardly facing surface, which faces towards the fourth axial opening, and a fourth outwardly facing surface, which does not face towards the fourth axial opening. The fourth inwardly facing surface and the fourth outwardly facing surface have a same surface roughness. The fourth leg portion is attached to the third leg portion and to the second end of the first support portion. The first helical winding is configured to engage at least one of the third helical winding or the fourth helical winding such that the first helical winding and at least one of the third helical winding or the fourth helical winding are axially aligned to receive the wire.

In an example, a support device for supporting a wire is provided. The support device comprises a first support portion extending along a non-linear axis between a first end and a second end. The first support portion defines a support opening through which the first support portion is configured to receive an attachment structure. The support device comprises a second support portion comprising a first leg portion having a first leg length. The first leg portion has a first helical winding that defines a first axial opening. A second leg portion has a second leg length. The second leg portion extends linearly. The second leg portion is attached to the first leg portion and to the first end of the first support portion. A third support portion comprises a third leg portion having a third leg length. The third leg portion has a third helical winding that defines a third axial opening. A fourth leg portion has a fourth leg length. The fourth leg portion has a fourth helical winding that defines a fourth axial opening. The fourth leg portion is attached to the third leg portion and to the second end of the first support portion. The second leg length is equal to the fourth leg length. The first leg length is different than the third leg length. The first helical winding is configured to engage at least one of the third helical winding or the fourth helical winding such that the first helical winding and at least one of the third helical winding or the fourth helical winding are axially aligned to receive the wire.

In an example, a method of supporting a wire with a support device is provided. The method comprises inserting a wire into a fourth axial opening defined by a fourth helical winding of a fourth leg portion to engage the wire with a fourth inwardly facing surface of the fourth helical winding. The fourth inwardly facing surface has a fourth surface roughness. The method comprises moving the wire axially within the fourth axial opening with respect to the fourth helical winding. The method comprises winding a first helical winding and a third helical winding around the wire such that the wire is received within a first axial opening defined by the first helical winding and a third axial opening defined by the third helical winding to engage the wire with a first inwardly facing surface of the first helical winding and a third inwardly facing surface of the third helical winding. The first inwardly facing surface has a first surface roughness different than the fourth surface roughness and the third inwardly facing surface has a third surface roughness different than the fourth surface roughness. As such, the wire is non-movable with respect to the first helical winding and the third helical winding upon the first helical winding and the third helical winding being wound around the wire.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 1:
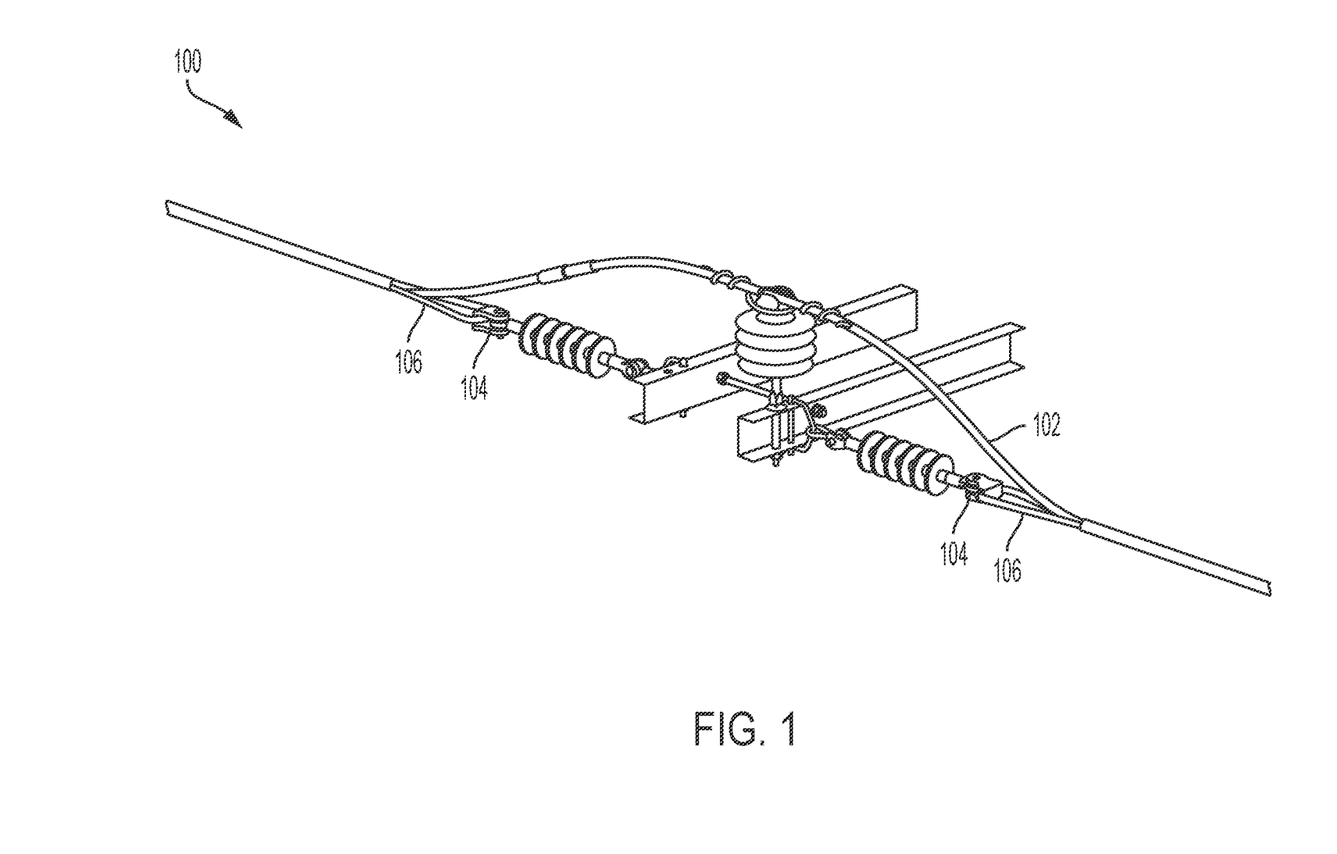
FIG. 1 is an illustration of an example support structure.

Turning to FIG. 1, an example overhead power line environment 100 is illustrated. The overhead power line environment 100 comprises any number of structures, configurations, constructions, etc., some of which may be described and/or illustrated with respect to FIGS. 1 to 12. In an example, the overhead power line environment 100 may be used in association with electric power transmission and/or distribution. One or more conductors may be suspended by a tower, pole, or the like.

The overhead power line environment 100 comprises a wire 102. In some examples, the wire 102 is an electrically conductive wire that may transmit electrical energy through the wire 102. The wire 102 (e.g., a power line, a conductor, etc.) may comprise a metal material that is electrically conductive. The wire 102 may extend between towers, poles, or the like and, in the illustrated example, may be supported at a distance above the ground (e.g., overhead).

The overhead power line environment 100 comprises an attachment structure 104. It will be appreciated that the example of FIG. 1 illustrates an exemplary attachment structure 104. However, in other examples, the attachment structure 104 is not limited to the illustrated size, shape, construction, design, etc. Rather, the attachment structure 104 comprises any number of constructions, some of which may be used to support a structure (e.g., the wire 102, etc.) at a distance above the ground with respect to a tower, pole, or the like. The attachment structure 104 may comprise a gripping portion, one or more fasteners, etc. The attachment structure 104 may be directly or indirectly attached to a tower, pole, or the like.

The overhead power line environment 100 comprises a support device 106 for supporting the wire 102. As will be described herein, the support device 106 may be applied over an outer sheath of the wire 102, such that the support device 106 may provide radial compression to the wire 102. As such, the support device 106 may support (e.g., hold, grip, etc.) the wire 102 and maintain a tension in the wire 102 without damaging the outer sheath of the wire 102. With the support device 106 supporting the wire 102, the wire 102 may pass over a structure (e.g., as illustrated), pass around a structure, bypass a structure, attach to a structure, terminate, etc.

Figure 2:
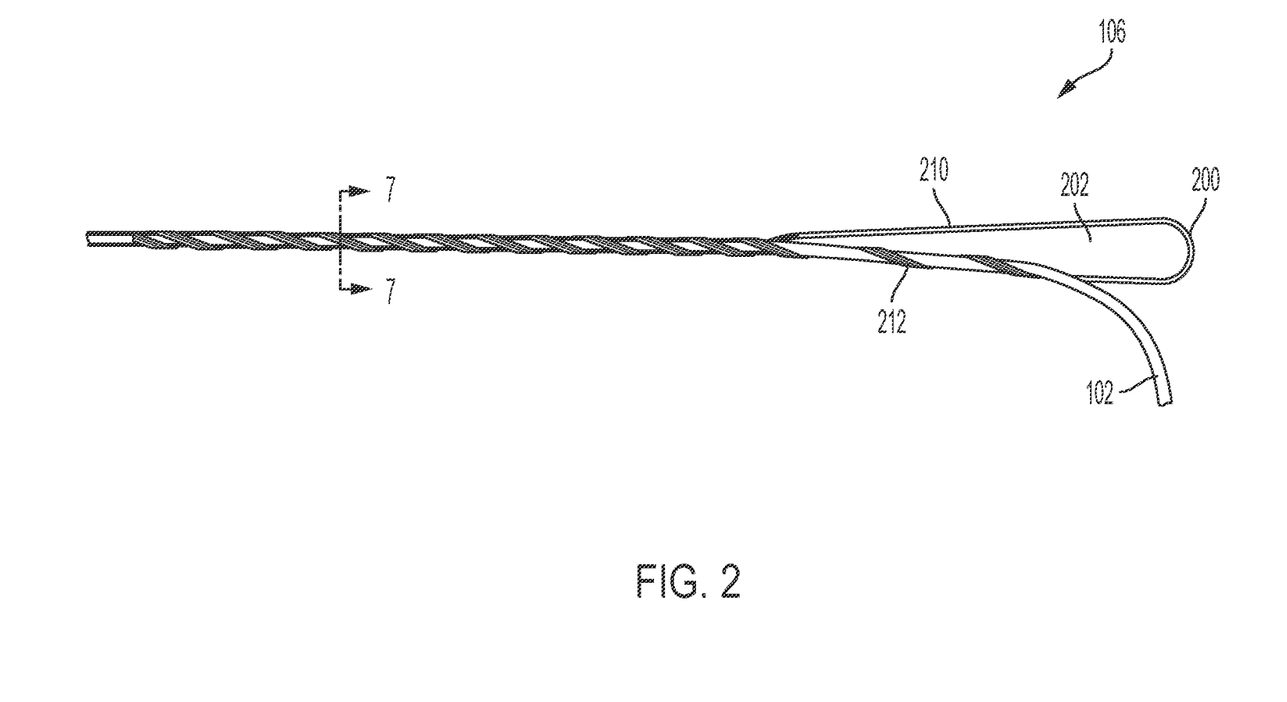
FIG. 2 is an illustration of an example support structure.

Turning to FIG. 2, the support device 106 is illustrated in association with the wire 102. It will be appreciated that in the illustrated example, a portion of the wire 102 is illustrated. In operation, however, the wire 102 may extend a longer or shorter distance than as illustrated, such as by extending in a similar manner as illustrated in FIG. 1.

Figure 4:
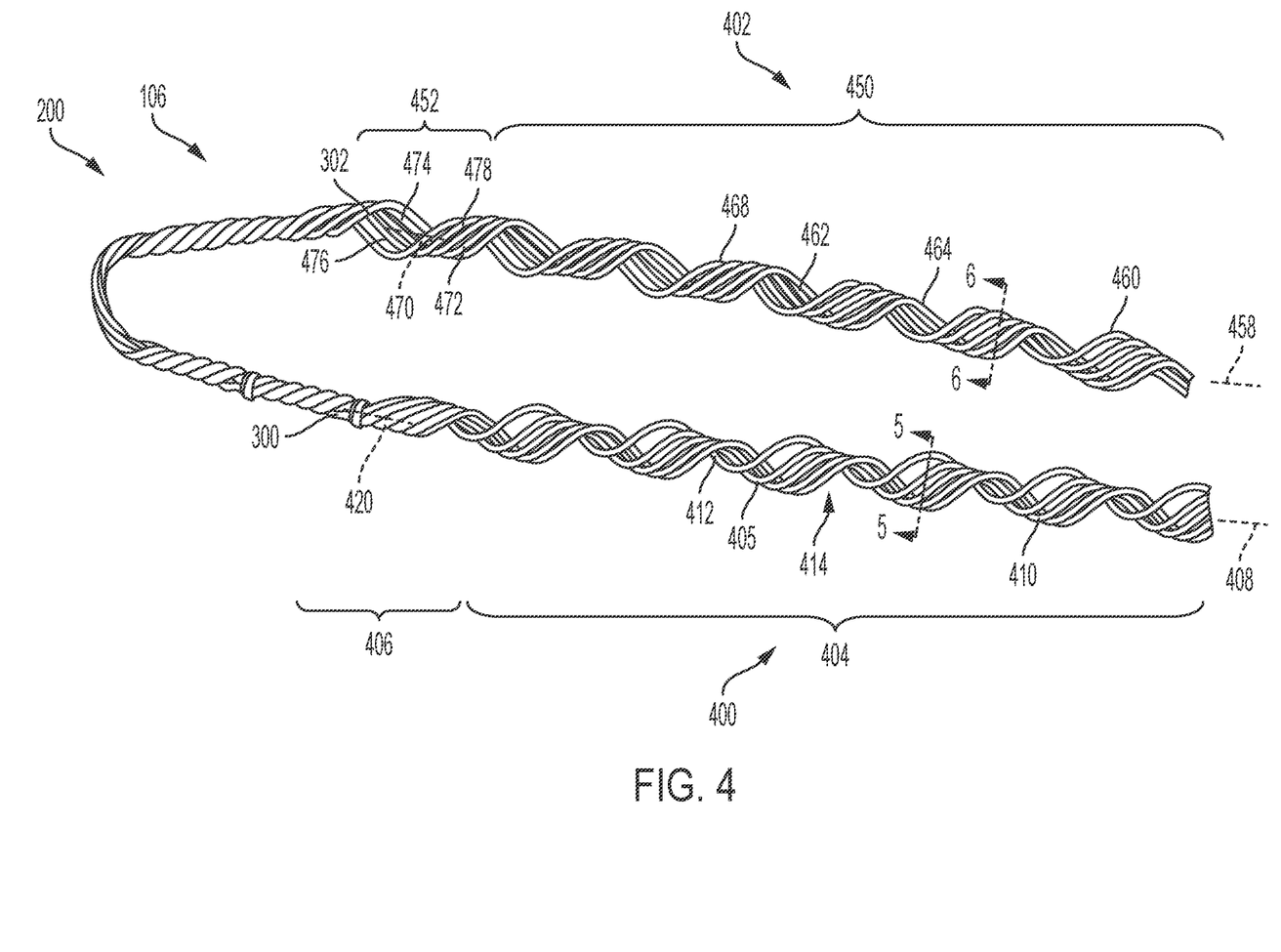
FIG. 4 is an illustration of an example support structure.

In an example, the support device 106 comprises a first support portion 200, a second support portion (e.g., illustrated in FIG. 4 as 400), and a third support portion (e.g., illustrated in FIG. 4 as 402). The first support portion 200 may define a support opening 202 through which the first support portion 200 is configured to receive the attachment structure 104. For example, a portion of the attachment structure 104 may extend partially and/or completely through the support opening 202. The attachment structure 104 (e.g., illustrated in FIG. 1) may grip, hold, wrap around, receive, and/or engage the first support portion 200. As such, the attachment structure 104 may support the support device 106, such as by supporting the support device 106 with respect to a tower, pole, or the like.

In the illustrated example, the support device 106 may be asymmetric about an axis along which the wire 102 extends. For example, one side of the support device 106 may have a substantially linear portion 210 while an opposing side of the support device 106 may have a helically wound portion 212. In this example, the wire 102 may initially be received within the helically wound portion 212 and adjusted/moved axially with respect to the helically wound portion 212. Once the wire 102 is adjusted to a desired position with respect to the helically wound portion 212, the remaining portions of the support device 106 may be wound around the wire 102.

Figure 3:
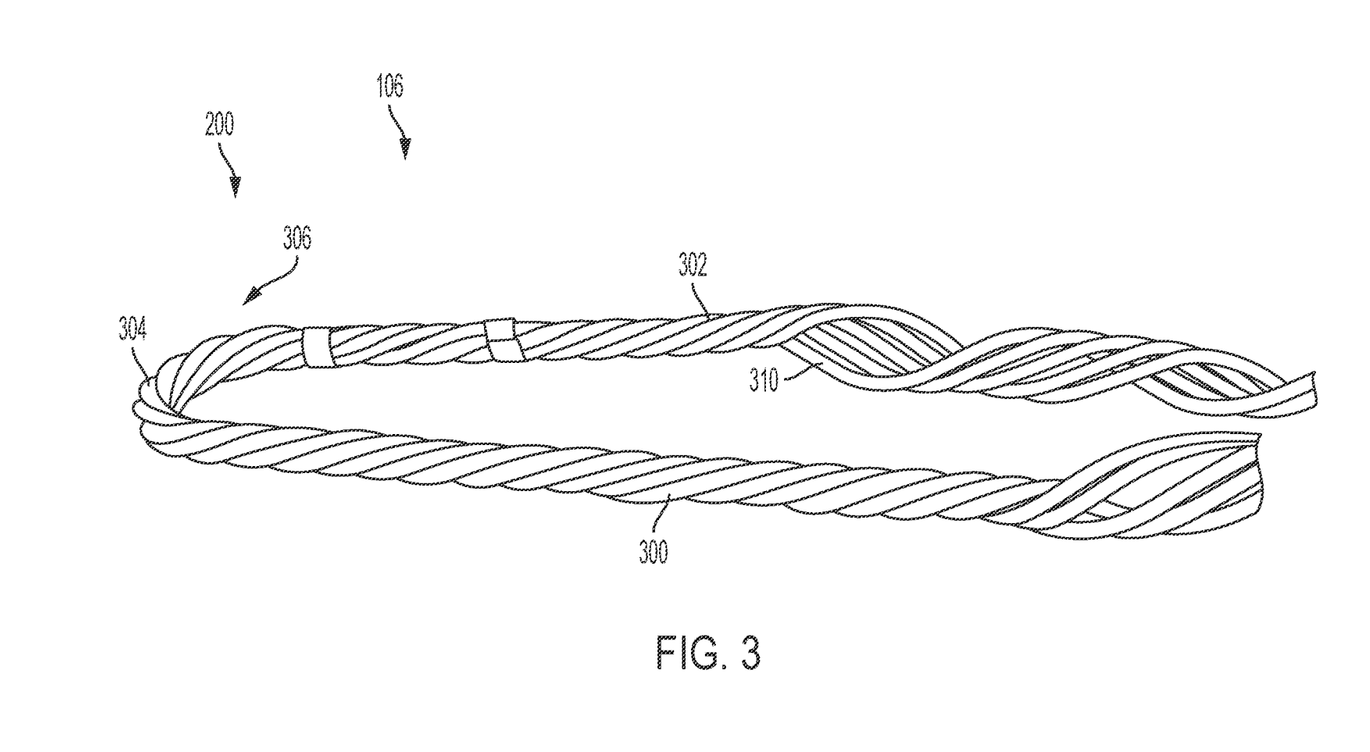
FIG. 3 is an illustration of an example support structure.

Turning to FIG. 3, the first support portion 200 of the support device 106 is illustrated. The first support portion 200 may extend along a non-linear axis between a first end 300 and a second end 302. In an example, the first support portion 200 comprises a bend 304 located between the first end 300 and the second end 302. In the illustrated example of FIG. 1, the attachment structure 104 may grip the bend 304. Due to the bend 304 and the non-linear shape, the first support portion 200 may have a U-shape 306.

The first support portion 200 comprises one or more strands 310. In an example, the strands 310 may extend between the first end 300 and the second end 302 of the first support portion 200. As will be described herein, the strands 310 comprise a support member (e.g., a wire, a metal wire, etc.) that is circumferentially surrounded by a jacket (e.g., a semiconductor material). While any number of strands 310 (e.g., one or more) may be provided, in the illustrated example, the first support portion 200 comprises five strands. The strands 310 have at least some degree of rigidity, stiffness, firmness, etc., such that the first support portion 200 is resistant to bending forces or the like.

In the illustrated example, the strands 310 may be wound about an elongated axis (e.g., a non-linear axis extending between the first end 300 and the second end 302 of the first support portion 200) to form a helical shape. In other examples, the strands 310 are not limited to the illustrated helical shape. For example, the strands 310 could instead extend substantially linearly in a direction that is parallel to the non-linear axis that extends between the first end 300 and the second end 302.

Turning to FIG. 4, the support device 106 comprises a second support portion 400 and a third support portion 402. The second support portion 400 may be attached to and/or extend from the first end 300 of the first support portion 200. The third support portion 402 may be attached to and/or extend from the second end 302 of the first support portion 200. In this way, the second support portion 400 and the third support portion 402 may be positioned substantially opposite each other.

The second support portion 400 comprises a first leg portion 404 and a second leg portion 406. Focusing upon the first leg portion 404, the first leg portion 404 may extend along a first support axis 408. The first leg portion 404 may have a first helical winding 410 that defines a first axial opening 412. The first helical winding 410 may helically wind about the first support axis 408. The first helical winding 410 defines one or more first spaces 414 disposed between neighboring helical winds. In an example, a dimension (e.g., a length and/or a width) of the first spaces 414 may substantially match a dimension (e.g., a length and/or a width) of first helical winds 405 of the first helical winding 410.

The second leg portion 406 of the second support portion 400 may be attached to the first leg portion 404 and to the first end 300 of the first support portion 200. For example, an end of the second leg portion 406 may be attached to the first leg portion 404 while an opposing end of the second leg portion 406 may be attached to the first end 300 of the first support portion 200. As such, the second leg portion 406 may be positioned between the first support portion 200 and the first leg portion 404.

The second leg portion 406 may extend substantially linearly between the first support portion 200 and the first leg portion 404. In an example, the second leg portion 406 may extend along a second support axis 420 that is substantially co-axial with respect to the first support axis 408. In an example, in contrast to the first axial opening 412 of the first leg portion 404, the second leg portion 406 may not comprise an axial opening. As such, in an example, the second leg portion 406 may not receive the wire 102. Rather, the second leg portion 406 may comprise the strands 310 (e.g., illustrated in FIG. 3) of the first support portion 200 that are relatively tightly wound, without forming a helical winding, spaces, or an axial opening.

In an example, the first leg portion 404 and the second leg portion 406 of the second support portion 400 comprise the strands 310. The strands 310 may extend adjacent to each other (e.g., side by side) to define the second support portion 400. In an example, the strands 310 may be wound so as to not form an axial opening or spaces within the second leg portion 406. The strands 310 may be wound differently to form the first helical winding 410 of the first leg portion 404. As such, within the first leg portion 404, the strands 310 have a plurality of first helical winds 405 that are separated by the first spaces 414 between neighboring first helical winds 405. In some examples, adjacent strands 310 may be in contact with each other, while, in other examples, gaps, spaces, channels, etc. may be defined between adjacent strands 310.

The third support portion 402 comprises a third leg portion 450 and a fourth leg portion 452. Focusing upon the third leg portion 450, the third leg portion 450 may extend along a third support axis 458. The third leg portion 450 may have a third helical winding 460 that defines a third axial opening 462. The third helical winding 460 may helically wind about the third support axis 458. The third helical winding 460 defines one or more third spaces 464 disposed between neighboring helical winds. In an example, a dimension (e.g., a length and/or a width) of the third spaces 464 may substantially match a dimension (e.g., a length and/or a width) of third helical winds 468 of the third helical winding 460.

The fourth leg portion 452 of the third support portion 402 may be attached to the third leg portion 450 and to the second end 302 of the first support portion 200. For example, an end of the fourth leg portion 452 may be attached to the first leg portion 404 while an opposing end of the fourth leg portion 452 may be attached to the second end 302 of the first support portion 200. As such, the fourth leg portion 452 may be positioned between the first support portion 200 and the third leg portion 450.

The fourth leg portion 452 may extend along a fourth support axis 470. The fourth leg portion 452 may have a fourth helical winding 472 that defines a fourth axial opening 476. The fourth helical winding 472 may helically wind about the fourth support axis 470. The fourth helical winding 472 defines one or more fourth spaces 474 disposed between neighboring helical winds. In an example, a dimension (e.g., a length and/or a width) of the fourth spaces 474 may substantially match a dimension (e.g., a length and/or a width) of fourth helical winds 478 of the fourth helical winding 472.

In an example, the third leg portion 450 and the fourth leg portion 452 of the third support portion 402 comprise the strands 310. The strands 310 may extend adjacent to each other (e.g., side by side) to define the third support portion 402. In an example, the strands 310 may be wound so as to form the third axial opening 462 and the third spaces 464 in the third leg portion 450 and the fourth axial opening 476 and the fourth spaces 474 in the fourth leg portion 452. In some examples, adjacent strands 310 may be in contact with each other, while, in other examples, gaps, spaces, channels, etc. may be defined between adjacent strands 310.

Figure 5:
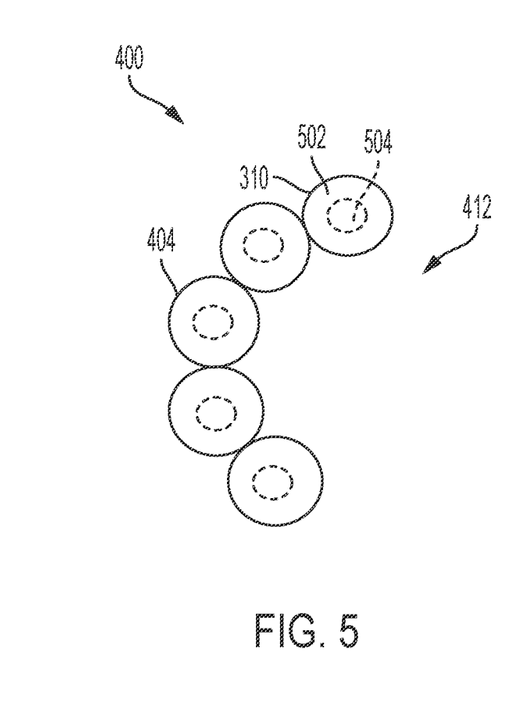
FIG. 5 is an illustration of an example support structure.

Turning to FIG. 5, a sectional view of the second support portion 400 as viewed from the perspective indicated by lines 5-5 of FIG. 4 is illustrated. In this example, the second support portion 400 has the first helical winding 410 that defines the first axial opening 412. The first axial opening 412 extends along the first support axis 408 and is defined within the first spaces 414 and the first helical winds 405 of the first helical winding 410. In this example, the first axial opening 412 (e.g., defined within the first helical winding 410) has a cross-sectional size (e.g., diameter) that is less than or equal to a cross-sectional size (e.g., diameter) of the wire 102. As such, the wire 102 may be tightly received at least partially within the first axial opening 412.

The second support portion 400 comprises a jacket 502 that circumferentially surrounds a support member 504. In an example, the jacket 502 has a semiconductor material. In this example, the jacket 502 is formed as part of the first support portion 200, the second support portion 400, and the third support portion 402. As such, the jacket 502 extends substantially along a length of the first support portion 200, the second support portion 400, and the third support portion 402. In this example, one or more of the strands 310 comprises the jacket 502 and the support member 504. As such, one or more of the support strands 310 comprise the jacket 502 circumferentially surrounding the support member 504.

In an example, the support member 504 comprises a relatively rigid material that provides at least some degree of rigidity, inflexibility, strength, support, etc. In some examples, the support member 504 comprises a metal material. The support member 504 may extend substantially along the length of the first support portion 200, the second support portion 400, and the third support portion 402. The support member 504 may extend along a non-linear axis between a first end (e.g., an end of the second support portion 400) and a second end (e.g., an end of the third support portion 402). As such, the jacket 502, while circumferentially surrounding the support member 504, may likewise extend between a first end (e.g., an end of the second support portion 400) and a second end (e.g., an end of the third support portion 402).

It will be appreciated that in the illustrated example of FIG. 5, the strands 310 (e.g., the first helical winding 404) are illustrated along a lateral side (e.g., the left side) of the first axial opening 412. However, the strands 310 are not limited to such a position. Indeed, due to the location of the cross-section (e.g., as illustrated in FIG. 4), the strands 310 are positioned along the lateral side (e.g., the left side) at that particular cross-section. Due to the strands 310 (e.g., the first helical winding 410) helically winding about the first support axis 408, at other cross-sectional locations, the strands 310 (e.g., the first helical winding 410) may be positioned along a top side, bottom side, opposing lateral side (e.g., the right side), etc. with respect to the first axial opening 412.

Figure 6:
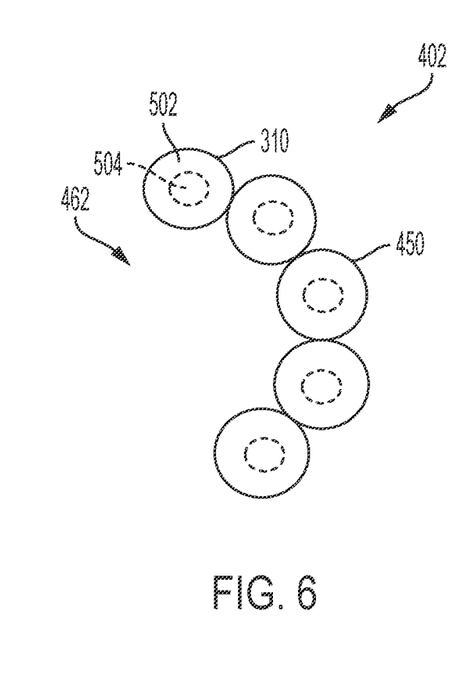
FIG. 6 is an illustration of an example support structure.

Turning to FIG. 6, a sectional view of the third support portion 402 as viewed from the perspective indicated by lines 6-6 of FIG. 4 is illustrated. In this example, the third support portion 402 has the third helical winding 460 that defines the third axial opening 462. The third axial opening 462 extends along the third support axis 458 and is defined within the third spaces 464 and the third helical winds 468 of the third helical winding 460. In this example, the third axial opening 462 has a cross-sectional size (e.g., diameter) that is less than or equal to a cross-sectional size (e.g., diameter) of the wire 102. As such, the wire 102 may be tightly received within the third axial opening 462.

The third support portion 402 comprises the jacket 502 that circumferentially surrounds the support member 504. The jacket 502 is formed as part of the first support portion 200, the second support portion 400, and the third support portion 402 such that the jacket 502 extends substantially along a length of the first support portion 200, the second support portion 400, and the third support portion 402. In this example, one or more of the strands 310 comprises the jacket 502 and the support member 504. As such, one or more of the support strands 310 comprise the jacket 502 circumferentially surrounding the support member 504.

It will be appreciated that in the illustrated example of FIG. 6, the strands 310 (e.g., the third helical winding 460) are illustrated along a lateral side (e.g., the right side) of the third axial opening 462. However, the strands 310 are not limited to such a position. Indeed, due to the location of the cross-section (e.g., as illustrated in FIG. 4), the strands 310 are positioned along the lateral side (e.g., the right side) at that particular cross-section. Due to the strands 310 (e.g., the third helical winding 460) helically winding about the third support axis 458, at other cross-sectional locations, the strands 310 (e.g., the third helical winding 460) may be positioned along a top side, bottom side, opposing lateral side (e.g., the left side), etc. with respect to the third axial opening 462.

Figure 7:
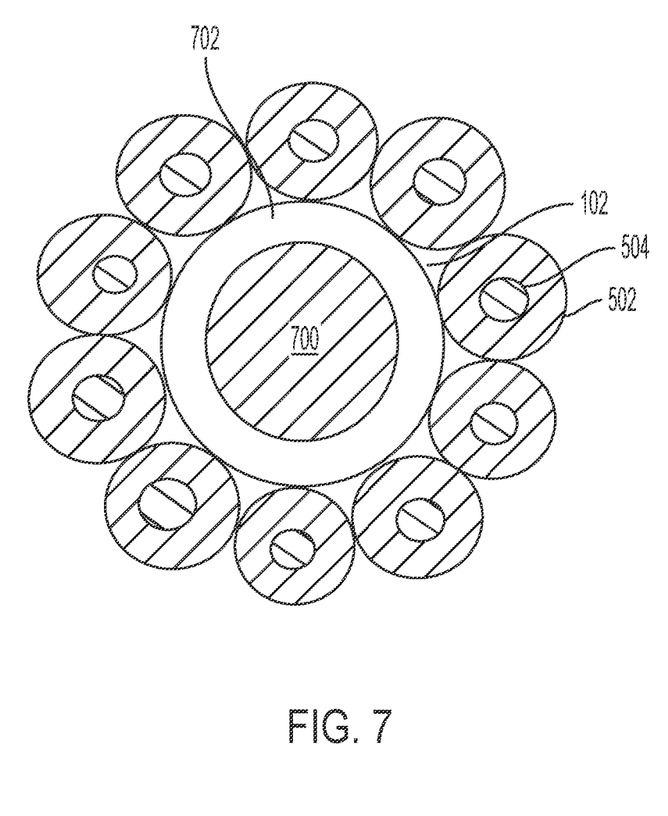
FIG. 7 is an illustration of an example support structure.

Turning to FIG. 7, a sectional view of the second support portion 400 and the third support portion 402 as viewed from the perspective indicated by lines 7-7 of FIG. 2 is illustrated. In this example, the second support portion 400 and the third support portion 402 are configured to engage each other and wind helically with respect to each other. For example, the first helical winding 410 of the first leg portion 404 and the third helical winding 460 of the third leg portion 450 are configured to engage one another such that the first axial opening 412 and the third axial opening 462 are axially aligned to receive the wire 102. In such an example, the first helical winding 410 and the third helical winding 460 engage each other such that the first helical winds 405 are positioned within the third spaces 464 while the third helical winds 468 are positioned within the first spaces 414. As such, the helical winds 405, 468 may circumferentially surround the wire 102, such that the first axial opening 412 and the third axial opening 462 extend substantially coaxial within the helical winds 405, 468 of the second support portion 400 and the third support portion 402.

When the wire 102 is received within the first axial opening 412 and the third axial opening 462, the wire 102 is positioned within the first helical winding 410 of the first leg portion 404 of the second support portion 400 and within the third helical winding 460 of the third leg portion 450 of the third support portion 402. The wire 102 has a cross-sectional size that is slightly larger than a cross-sectional size of the first axial opening 412 and the third axial opening 462, such that an outer surface of the wire 102 is in compressed contact with (e.g., compressed by) the first helical winding 410 and the third helical winding 460.

In this example, the wire 102 comprises a conductor 700 that is circumferentially surrounded by a wire jacket 702. The conductor 700 may be electrically conductive, such as by comprising a metal material, for example, and may extend within the wire jacket 702. Electrical energy may be transmitted through the conductor 700. In an example, the wire jacket 702 comprises an electrically insulating material. As such, electrical energy that is transmitted through the conductor 700 may not flow through the wire jacket 702. In an example, when the wire 102 is received within the first axial opening 412 and the third axial opening 462, the support device 106 (e.g., the second support portion 400 and the third support portion 402) does not puncture the wire jacket 702 of the wire 102. Rather, the wire jacket 702 remains intact so as to circumferentially surround the conductor 700.

Figure 8:
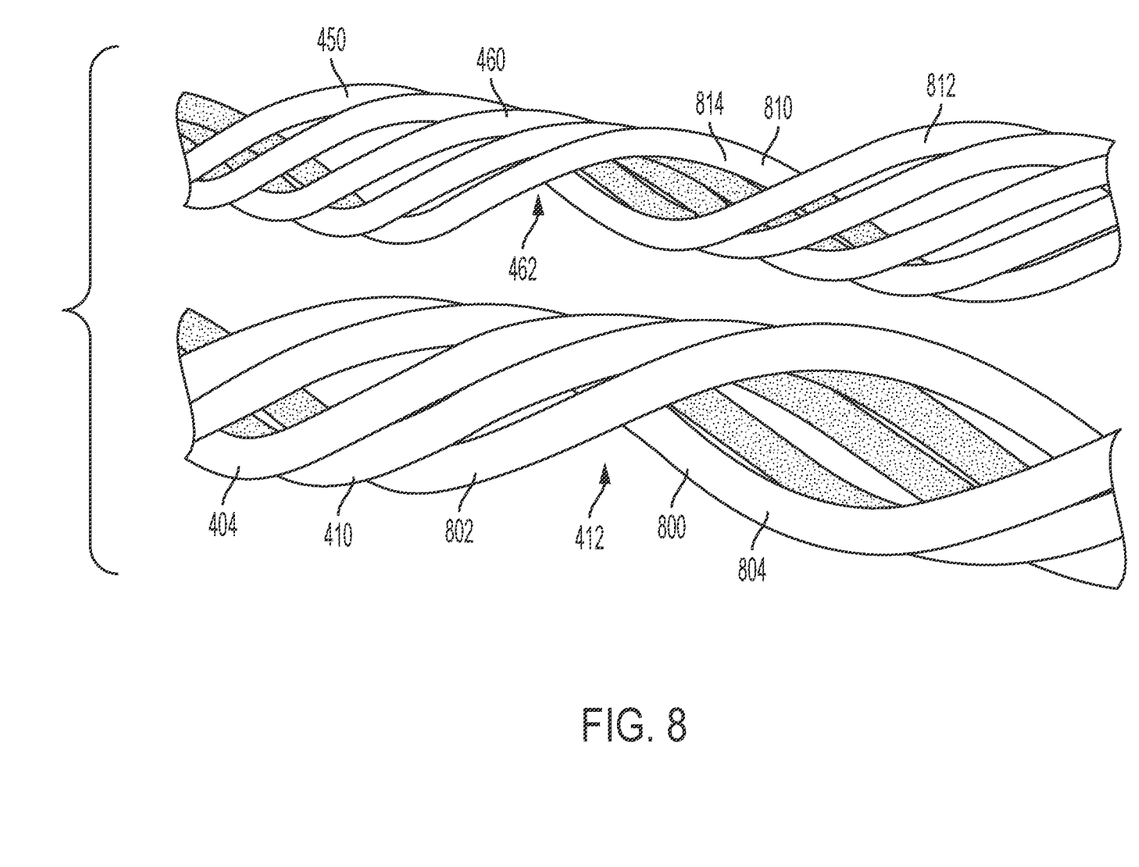
FIG. 8 is an illustration of an example support structure.

Turning to FIG. 8, the first leg portion 404 of the second support portion 400 and the third leg portion 450 of the third support portion 402 are illustrated. In an example, the first helical winding 410 of the first leg portion 404 comprises a first inwardly facing surface 800 and a first outwardly facing surface 802. In an example, the first inwardly facing surface 800 may face radially inwardly towards the first axial opening 412. The first outwardly facing surface 802 may face in an opposing direction and may not face the first axial opening 412. For example, the first outwardly facing surface 802 may face radially outwardly away from the first axial opening 412. As such, the first outwardly facing surface 802 of the first helical winding 410 does not face towards the first axial opening 412.

In the illustrated example, the first helical winding 410 comprises a first friction facilitating portion 804. The first friction facilitating portion 804 may be disposed on some or all of a surface of the first helical winding 410. For example, the first friction facilitating portion 804 may be disposed on the first inwardly facing surface 800 of the first helical winding 410, such that the first friction facilitating portion 804 may face towards and/or come into contact with the wire 102. In an example, the first friction facilitating portion 804 may define an increased surface roughness of the first helical winding 410 as compared to portions of the first helical winding 410 that do not have the first friction facilitating portion 804 (e.g., the first outwardly facing surface 802). In some examples, the first friction facilitating portion 804 defines a relatively increased roughness, unevenness, irregular, etc. portion of the first helical winding 410 as compared to portions of the first helical winding 410 (e.g., the first outwardly facing surface 802) that do not have the first friction facilitating portion 804.

In some examples, the first friction facilitating portion 804 comprises a material that may be separately attached to the first inwardly facing surface 800 of the first helical winding 410. For example, the first friction facilitating portion 804 may comprise grit, sand, or other fine particulate materials that may be attached (e.g., adhered, glued, etc.) to the first inwardly facing surface 800 of the first helical winding 410.

In an example, the third helical winding 460 of the third leg portion 450 comprises a third inwardly facing surface 810 and a third outwardly facing surface 812. In an example, the third inwardly facing surface 810 may face radially inwardly towards the third axial opening 462. The third outwardly facing surface 812 may face in an opposing direction and may not face the third axial opening 462. For example the third outwardly facing surface 812 may face radially outwardly away from the third axial opening 462. As such, the third outwardly facing surface 812 of the third helical winding 460 does not face towards the third axial opening 462.

In the illustrated example, the third helical winding 460 comprises a third friction facilitating portion 814. The third friction facilitating portion 814 may be disposed on some or all of a surface of the third helical winding 460. For example, the third friction facilitating portion 814 may be disposed on the third inwardly facing surface 810 of the third helical winding 460, such that the third friction facilitating portion 814 may face towards and/or come into contact with the wire 102. In an example, the third friction facilitating portion 814 may define an increased surface roughness of the third helical winding 460 as compared to portions of the third helical winding 460 that do not have the third friction facilitating portion 814 (e.g., the third outwardly facing surface 812). In some examples, the third friction facilitating portion 814 defines a relatively increased roughness, unevenness, irregular, etc. portion of the third helical winding 460 as compared to portions of the third helical winding 460 (e.g., the first outwardly facing surface 802) that do not have the third friction facilitating portion 814.

In some examples, the third friction facilitating portion 814 comprises a material that may be separately attached to the third inwardly facing surface 810 of the third helical winding 460. For example, the third friction facilitating portion 814 may comprise grit, sand, or other fine particulate materials that may be attached (e.g., adhered, glued, etc.) to the third inwardly facing surface 810 of the third helical winding 460.

By increasing the friction of the first inwardly facing surface 800 and the third inwardly facing surface 810, contact between the jacket 502 and the wire 102 (e.g., the wire jacket 702) is facilitated. For example, movement of the wire 102 with respect to the jacket 502 and/or movement of the jacket 502 with respect to the wire 102 is reduced due to the friction facilitating portions 804, 814 contacting the wire jacket 702 of the wire 102 when the wire 102 is received within the first axial opening 412 and the third axial opening 462. This reduced movement is due, at least in part, to the increased frictional force that is provided by the friction facilitating portion that resists movement.

Figure 9:
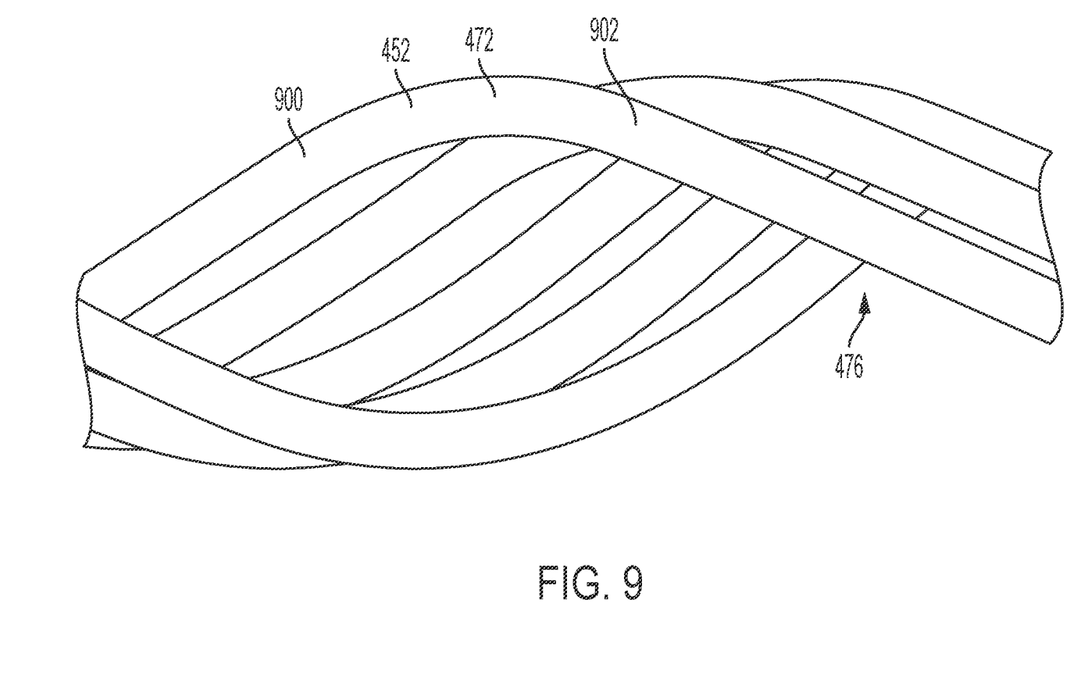
FIG. 9 is an illustration of an example support structure.

Turning to FIG. 9, the fourth leg portion 452 of the third support portion 402 is illustrated. In an example, the fourth helical winding 472 of the fourth leg portion 452 comprises a fourth inwardly facing surface 900 and a fourth outwardly facing surface 902. In an example, the fourth inwardly facing surface 900 may face radially inwardly towards the fourth axial opening 476. The fourth outwardly facing surface 902 may face in an opposing direction and may not face the fourth axial opening 476. For example, the fourth outwardly facing surface 902 may face radially outwardly away from the fourth axial opening 476. As such, the fourth outwardly facing surface 902 of the fourth helical winding 472 does not face towards the fourth axial opening 476.

In an example, the fourth inwardly facing surface 900 may not comprise a friction facilitating portion like the first inwardly facing surface 800 and the third inwardly facing surface 810. In an example, the fourth inwardly facing surface 900 and the fourth outwardly facing surface 902 may comprise the same material and have the same surface roughness. The fourth inwardly facing surface 900 may have a different surface roughness than the first inwardly facing surface 800 and the third inwardly facing surface 810. For example, the first inwardly facing surface 800 and the third inwardly facing surface 810 may have an increased surface roughness (e.g., due to the friction facilitating portions) relative to the fourth inwardly facing surface 900. In this way, when the wire 102 is received within the fourth axial opening 476, the wire 102 may be moved axially within the fourth axial opening 476 with respect to the fourth helical winding 472 (e.g., with less resistance as compared to moving the wire 102 with respect to helical windings other than the fourth helical winding 472).

In an example, the first friction facilitating portion 804 and/or the third friction facilitating portion 814 may alternatively or additionally comprise features formed within, from, on, etc. the first inwardly facing surface 800 and/or the third inwardly facing surface 810. For example, the first inwardly facing surface 800 and/or the third inwardly facing surface 810 may be roughed (e.g., using an abrasive, acid, sand blasting, etc.) so as to be non-uniform (e.g., have pitting, etc.) and thereby have an increased coefficient of friction relative to a coefficient of friction of the fourth inwardly facing surface 900.

Barbs, protrusions, etc. may emanate from the first inwardly facing surface 800 and/or the third inwardly facing surface 810 so as to have an increased coefficient of friction relative to a coefficient of friction of the fourth inwardly facing surface 900, for example. At least some barbs, protrusions, etc. may emanate from the first inwardly facing surface 800 and/or the third inwardly facing surface 810 along different axes relative to the first inwardly facing surface 800 and/or the third inwardly facing surface 810 (e.g., so that at least some of such barbs, protrusions, etc. are not parallel to one another). Such a non-parallel arrangement(s) may inhibit movement of the wire 102 relative to helical windings comprising the same.

In an example, the fourth inwardly facing surface 900 may have a directional friction facilitating portion that provides less resistance to movement of the wire 102 in one direction as compared to another direction. For example, barbs, protrusions, features, etc. may emanate from the fourth inwardly facing surface 900 at an angle(s) relative to the fourth inwardly facing surface 900 so as to allow the wire 102 to move more easily in a direction toward the first support portion 200 as compared to a direction away from the first support portion 200.

Barbs, protrusions, features, etc. emanating from the fourth inwardly facing surface 900 may, for example, form a first angle(s) that is acute relative to the fourth inwardly facing surface 900 and a second angle(s) that is obtuse relative to the fourth inwardly facing surface 900, where the first angle faces toward the first support portion 200 and the second angle faces away from first support portion 200. The wire 102 may thus be able to glide over the barbs, protrusions, features, etc. in a direction toward the first support portion 200 with relative ease, but may be somewhat caught by the barbs, protrusions, features, etc. (e.g., points, tips, etc. thereof) when movement of the wire 102 is in a direction away from the first support portion 200. The wire 102 may thus be able to move more easily with the grain in a direction toward the first support portion 200 as compared to against the grain in a direction away from the first support portion 200. The smaller the first angle(s) or the more the barbs, protrusions, features, etc. "point" toward the first support portion 200 the easier the wire 102 may move in a direction toward the first support portion 200 and/or the greater the first angle(s) or the less the barbs, protrusions, features, etc.

"point" toward the first support portion 200 the more difficult it may be for the wire 102 to move in a direction toward the first support portion 200.

In an example, the first inwardly facing surface 800, the third inwardly facing surface 810, and/or the fourth inwardly facing surface 900 may be scored to establish (e.g., at least some of) the first friction facilitating portion 804, the third friction facilitating portion 814, and/or the directional friction facilitating portion. Scoring may, for example, comprise cutting, scratching, grinding, etc. notches, lines, grooves, reliefs, etc. into the first inwardly facing surface 800, the third inwardly facing surface 810 and/or the fourth inwardly facing surface 900 to increase surface roughness/coefficient of friction.

Once the wire 102 has been adjusted, the first helical winding 410 and the third helical winding 460 may be wound around the wire 102 such that the wire 102 may be received within the first axial opening 412 defined by the first helical winding 410 and the third axial opening 462 defined by the third helical winding 460. As such, the first inwardly facing surface 800 of the first helical winding 410 and the third inwardly facing surface 810 of the third helical winding 460 may engage the wire 102. Due to the surface roughness of the first inwardly facing surface 800 and the third inwardly facing surface 810, the wire 102 is substantially non-movable with respect to the first helical winding 410 and the third helical winding 460 upon the first helical winding 410 and the third helical winding 460 being wound around the wire 102.

Figure 10:
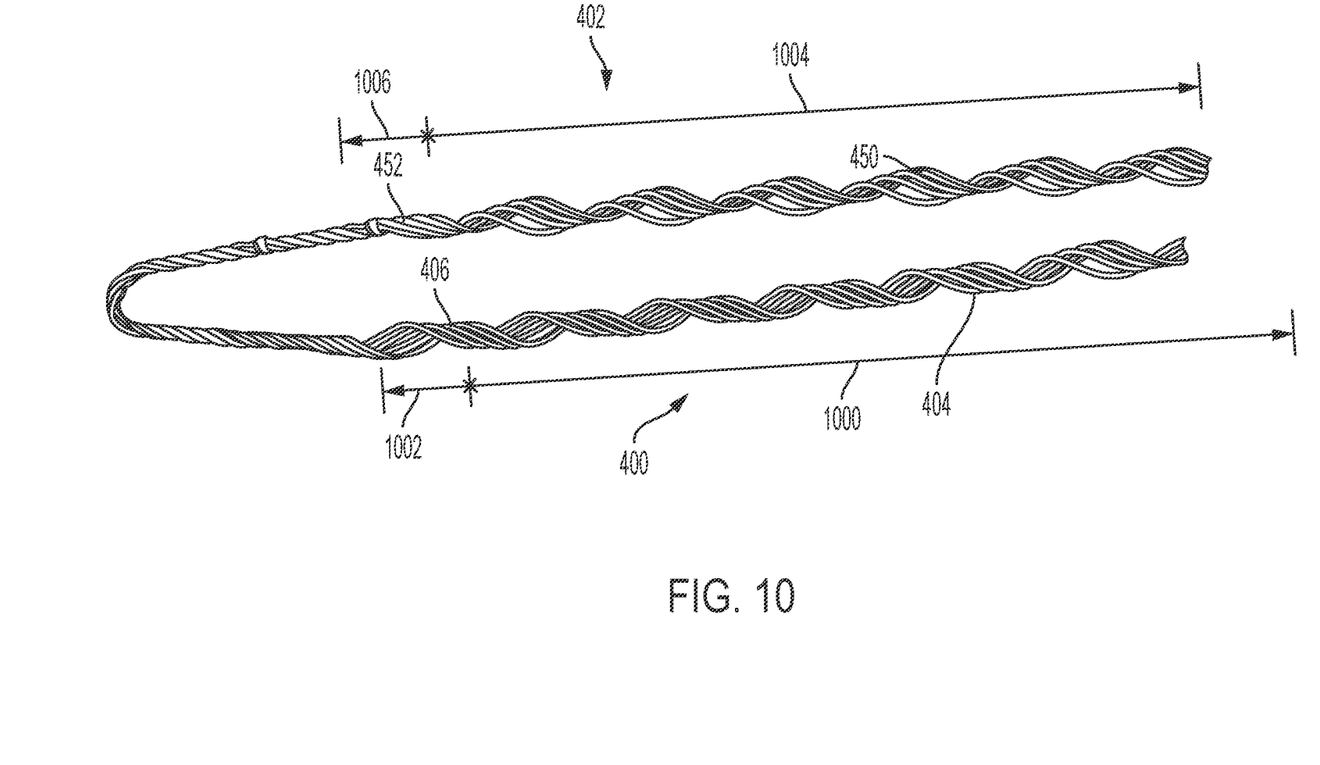
FIG. 10 is an illustration of an example support structure.

Referring to FIG. 10, in an example, the second support portion 400 and the third support portion 402 may have different lengths. For example, the first leg portion 404 may have a first leg length 1000. The second leg portion 406 may have a second leg length 1002. The third leg portion 450 may have a third leg length 1004. The fourth leg portion 452 may have a fourth leg length 1006.

In an example, a sum of the third leg length 1004 and the fourth leg length 1006 may be greater than the first leg length 1000. In an example, the second leg length 1002 may be equal to the fourth leg length 1006 while the first leg length 1000 may be different than the third leg length 1004. For example, the first leg length 1000 may be greater than the third leg length 1004. In this way, when the first helical winding 410 engages at least one of the third helical winding 460 or the fourth helical winding 472, an end of the first leg portion 404 opposite the second leg portion 406 may be axially offset from an end of the third leg portion 450 opposite the fourth leg portion 452 along an axis along which the wire 102 extends.

Figure 11:
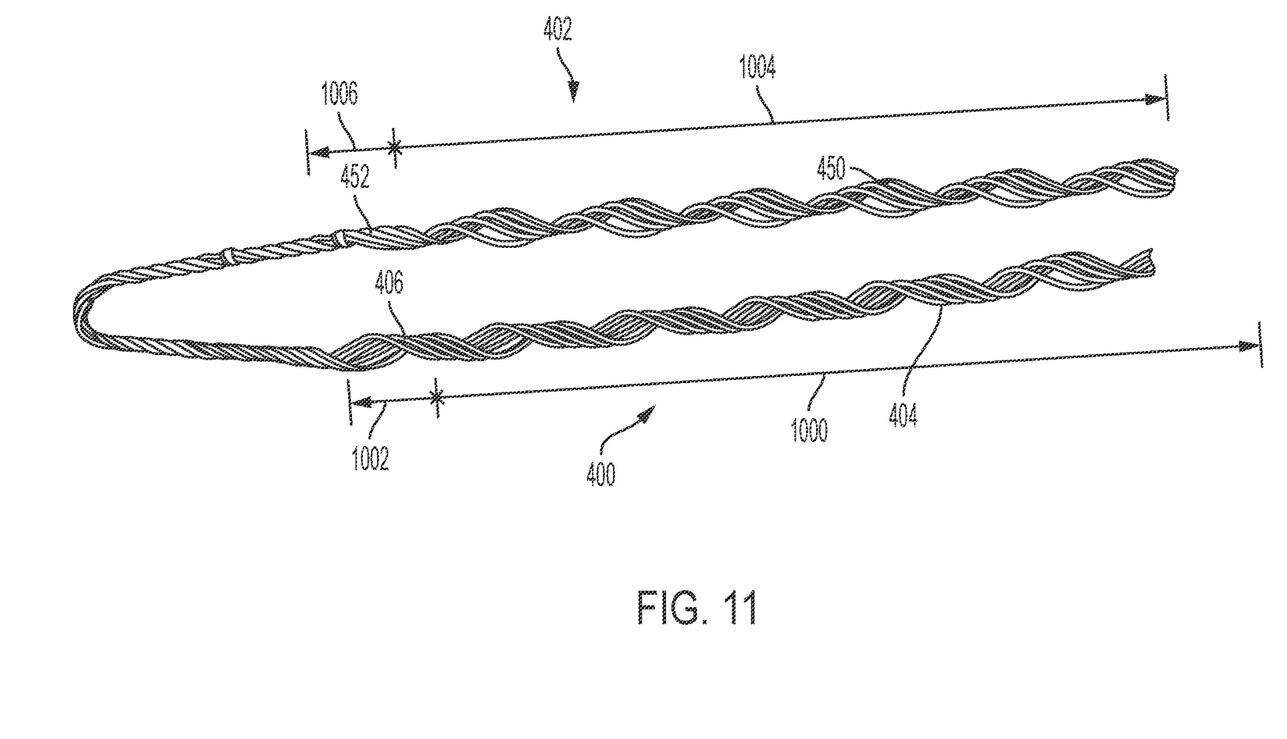
FIG. 11 is an illustration of an example support structure.

Referring to FIG. 11, an example of the second support portion 400 and the third support portion 402 having different lengths is illustrated. In this example, the second leg length 1002 may be equal to the fourth leg length 1006 while the first leg length 1000 may be different than the third leg length 1004. For example, the first leg length 1000 may be less than the third leg length 1004. In this way, when the first helical winding 410 engages at least one of the third helical winding 460 or the fourth helical winding 472, an end of the first leg portion 404 opposite the second leg portion 406 may be axially offset from an end of the third leg portion 450 opposite the fourth leg portion 452 along an axis along which the wire 102 extends.

The differing lengths of the support portions provide a number of benefits. For example, enhanced gripping of the wire 102 by the support portions may be achieved. In addition, attachment of the support portions to the wire is also improved.

Figure 12:
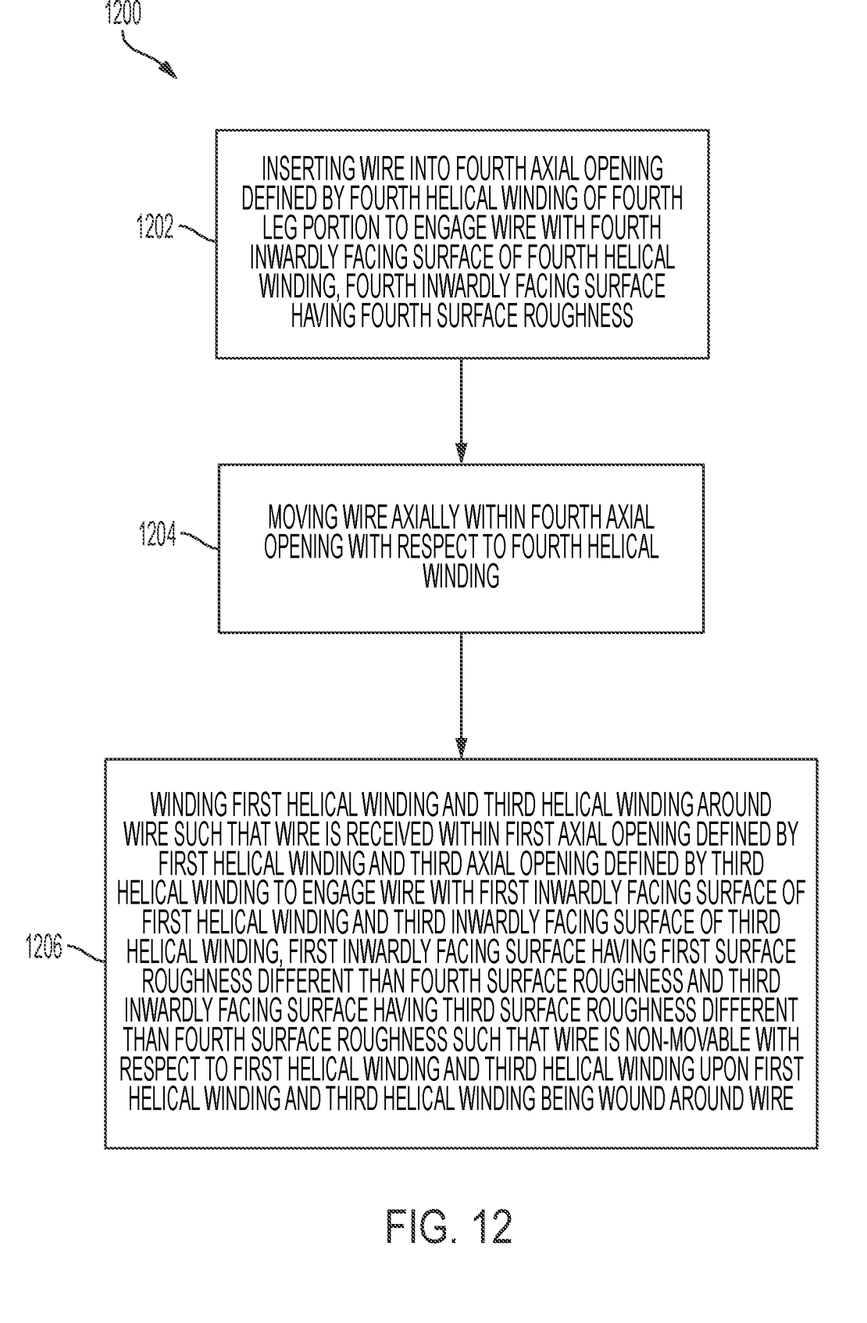
FIG. 12 is an illustration of an example method of supporting a wire with a support device.

Referring to FIG. 12, a method 1200 of supporting the wire 102 with the support device 106 is illustrated. At 1202, the method 1200 comprises inserting the wire 102 into the fourth axial opening 476 defined by the fourth helical winding 472 of the fourth leg portion 452. As such, the wire 102 may be engaged with the fourth inwardly facing surface 900 of the fourth helical winding 472, with the fourth inwardly facing surface 900 having a fourth surface roughness.

At 1204, the method 1200 comprises moving the wire 102 axially within the fourth axial opening 476 with respect to the fourth helical winding 472.

At 1206, the method 1200 comprises winding the first helical winding 410 and the third helical winding 460 around the wire 102 such that the wire 102 is received within the first axial opening 412, defined by the first helical winding 410, and the third axial opening 462, defined by the third helical winding 460, to engage the wire 102 with the first inwardly facing surface 800 of the first helical winding 410 and the third inwardly facing surface 810 of the third helical winding 460. The first inwardly facing surface 800 may have a first surface roughness that is different that the fourth surface roughness of the fourth inwardly facing surface 900. The third inwardly facing surface 810 may have a third surface roughness that is different than the fourth surface roughness. As such, the wire 102 is substantially non-movable with respect to the first helical winding 410 and the third helical winding 460 upon the first helical winding 410 and the third helical winding 460 being wound around the wire 102.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A support device for supporting a wire, the support device comprising:
   a first support portion extending along a non-linear axis between a first end and a second end, the first support portion defining a support opening through which the first support portion is configured to receive an attachment structure;
   a second support portion comprising:
      a first leg portion having a first helical winding that defines a first axial opening; and
      a second leg portion extending linearly, the second leg portion attached to the first leg portion and to the first end of the first support portion; and
   a third support portion comprising:
      a third leg portion having a third helical winding that defines a third axial opening, the third helical winding having a third inwardly facing surface, which faces towards the third axial opening, and a third outwardly facing surface, which does not face towards the third axial opening, the third inwardly facing surface and the third outwardly facing surface having a different surface roughness; and
      a fourth leg portion having a fourth helical winding that defines a fourth axial opening, the fourth helical winding having a fourth inwardly facing surface, which faces towards the fourth axial opening, and a fourth outwardly facing surface, which does not face towards the fourth axial opening, the fourth inwardly facing surface and the fourth outwardly facing surface having a same surface roughness, the fourth leg portion attached to the third leg portion and to the second end of the first support portion;
   wherein the first helical winding is configured to engage at least one of the third helical winding or the fourth helical winding such that the first helical winding and at least one of the third helical winding or the fourth helical winding are axially aligned to receive the wire.

2. The support device of claim 1, wherein:
   the first leg portion has a first leg length;
   the second leg portion has a second leg length;
   the third leg portion has a third leg length; and
   the fourth leg portion has a fourth leg length.

3. The support device of claim 2, wherein a sum of the third leg length and the fourth leg length is greater than the first leg length.

4. The support device of claim 3, wherein the second leg length is equal to the fourth leg length and the first leg length is different than the third leg length.

5. The support device of claim 3, wherein the first leg length is greater than the third leg length.

6. The support device of claim 3, wherein the first leg length is less than the third leg length.

7. The support device of claim 1, wherein when the first helical winding engages at least one of the third helical winding or the fourth helical winding, an end of the first leg portion opposite the second leg portion is axially offset from an end of the third leg portion opposite the fourth leg portion along an axis along which the wire extends.

8. The support device of claim 1, wherein the fourth inwardly facing surface has a different surface roughness than the third inwardly facing surface.

9. The support device of claim 8, wherein the third inwardly facing surface has a greater surface roughness than the fourth inwardly facing surface.

10. The support device of claim 9, wherein, when the wire is received within the fourth axial opening, the wire is movable axially within the fourth axial opening with respect to the fourth helical winding.

11. The support device of claim 9, wherein the wire is non-movable with respect to the first helical winding and the third helical winding upon the first helical winding and the third helical winding receiving the wire within the first axial opening and the third axial opening.

12. A support device for supporting a wire, the support device comprising:
   a first support portion extending along a non-linear axis between a first end and a second end, the first support portion defining a support opening through which the first support portion is configured to receive an attachment structure;
   a second support portion comprising:
      a first leg portion having a first leg length, the first leg portion having a first helical winding that defines a first axial opening; and
      a second leg portion having a second leg length, the second leg portion extending linearly, the second leg portion attached to the first leg portion and to the first end of the first support portion; and
   a third support portion comprising:
      a third leg portion having a third leg length, the third leg portion having a third helical winding that defines a third axial opening; and
      a fourth leg portion having a fourth leg length, the fourth leg portion having a fourth helical winding that defines a fourth axial opening, the fourth leg portion attached to the third leg portion and to the second end of the first support portion, the second leg length equal to the fourth leg length, the first leg length different than the third leg length;
   wherein the first helical winding is configured to engage at least one of the third helical winding or the fourth helical winding such that the first helical winding and at least one of the third helical winding or the fourth helical winding are axially aligned to receive the wire.

13. The support device of claim 12, wherein when the first helical winding engages at least one of the third helical winding or the fourth helical winding, an end of the first leg portion opposite the second leg portion is axially offset from an end of the third leg portion opposite the fourth leg portion along an axis along which the wire extends.

14. The support device of claim 12, wherein the first leg length is greater than the third leg length.

15. The support device of claim 12, wherein the first leg length is less than the third leg length.

16. The support device of claim 12, the third helical winding having a third inwardly facing surface, which faces towards the third axial opening, and a third outwardly facing surface, which does not face towards the third axial opening, the third inwardly facing surface and the third outwardly facing surface having a different surface roughness.

17. The support device of claim 16, the fourth helical winding having a fourth inwardly facing surface, which faces towards the fourth axial opening, and a fourth outwardly facing surface, which does not face towards the fourth axial opening, the fourth inwardly facing surface and the fourth outwardly facing surface having a same surface roughness.

18. A method of supporting a wire with a support device, the method comprising:
  inserting a wire into a fourth axial opening defined by a fourth helical winding of a fourth leg portion to engage the wire with a fourth inwardly facing surface of the fourth helical winding, the fourth inwardly facing surface having a fourth surface roughness;
  moving the wire axially within the fourth axial opening with respect to the fourth helical winding; and
  winding a first helical winding and a third helical winding around the wire such that the wire is received within a first axial opening defined by the first helical winding and a third axial opening defined by the third helical winding to engage the wire with a first inwardly facing surface of the first helical winding and a third inwardly facing surface of the third helical winding, the first inwardly facing surface having a first surface roughness different than the fourth surface roughness and the third inwardly facing surface having a third surface roughness different than the fourth surface roughness such that the wire is non-movable with respect to the first helical winding and the third helical winding upon the first helical winding and the third helical winding being wound around the wire.

19. The method of claim 18, wherein the wire is moved axially within the fourth axial opening prior to winding the first helical winding and the third helical winding around the wire.

20. The method of claim 18, wherein when the first helical winding and the third helical winding are wound around the wire, an end of the first helical winding is axially offset from an end of the third helical winding along an axis along which the wire extends.

* * * * *